United States Patent [19]
Santella et al.

[11] Patent Number: 5,413,876
[45] Date of Patent: May 9, 1995

[54] NICKEL ALUMINIDE ALLOYS WITH IMPROVED WELDABILITY

[75] Inventors: Michael L. Santella, Knoxville; Gene M. Goodwin, Lenior City, both of Tenn.

[73] Assignee: Martin Marietta Energy Systems, Inc., Oak Ridge, Tenn.

[21] Appl. No.: 970,757

[22] Filed: Nov. 2, 1992

[51] Int. Cl.$^6$ .................. B32B 15/01; C22C 19/05
[52] U.S. Cl. ...................... 428/680; 148/410; 148/428; 420/445; 228/262.3
[58] Field of Search ............... 420/445; 148/410, 428; 228/263.13, 262.3, 262.31; 428/680

[56] References Cited

U.S. PATENT DOCUMENTS 4,731,221  5/1988  Liu .
5,108,700  4/1992  Liu .

OTHER PUBLICATIONS

Liu, C. T. et al J. Metals 38(5) 19–21 May 1986.

*Primary Examiner*—Scott Kastler
*Assistant Examiner*—Margery S. Phipps
*Attorney, Agent, or Firm*—Earl L. Larcher; J. Donald Griffin; Harold W. Adams

[57] ABSTRACT

Weldable nickel aluminide alloys which are essentially free, if not entirely free, of weld hot cracking are provided by employing zirconium concentrations in these alloys of greater than 2.6 wt. % or sufficient to provide a substantial presence of Ni—Zr eutectic phase in the weld so as to prevent weld hot cracking. Weld filler metals formed from these so modified nickel aluminide alloys provide for crack-free welds in previously known nickel aluminide alloys.

10 Claims, 3 Drawing Sheets

NICKEL ALUMINIDE ALLOYS WITH IMPROVED WELDABILITY

This invention was made with the support of the United States Government under contract No. DE-A05-84OR21400 awarded by the U. S. Department of Energy. The United States Government has certain rights in this invention.

BACKGROUND OF THE INVENTION

The present invention relates generally to weldable nickel aluminide alloys, and more particularly to such nickel aluminide alloys and weld filler metal formed therefrom containing concentrations of zirconium greater than in previously available nickel aluminide alloys for significantly increasing the resistance of the present nickel aluminide alloys and previously known nickel aluminides welded by the present filler metal to weld hot cracking during the welding thereof.

Recently developed nickel aluminide alloys possess various properties such as desirable high temperature yield strength and ductility, high resistance to oxidation, and room temperature yield strengths greater than 80 ksi in an "as cast" condition. These properties make these alloys particularly suitable as engineering materials for use in many structural applications and product forms including sheet, plate, bar, tubing piping, wire, and castings. Nickel aluminide alloys possessing these properties are described in assignee's U.S. Pat. No. 4,731,221, issued Mar. 15, 1988 and entitled "Nickel Aluminides and Nickel-Iron Aluminides For Use In Oxidizing Environments" and in assignees's U.S. Pat. No. 5,108,700, issued Apr. 28, 1992 and entitled "Castable Nickel Aluminide Alloys For Structural Applications".

While the nickel aluminide alloys such as described in these patents represent significant improvements over previously known nickel aluminide alloys, these alloys have been found to have poor resistance to weld hot cracking so as to cause these alloys to be classified as being of poor weldability as evidenced by the high level of difficulty in providing and reproducing crack-free welds. For example, the nickel aluminide alloys identified in assignee's aforementioned patents as IC221 and IC396 and respectively having a composition of a nickel base with, in wt. %, 8% aluminum, 7.7% chromium, 1.5% zirconium, and 0.003% boron, and a composition of nickel base with 8% aluminum, 7.7% chromium, 3% molybdenum, 0.85% zirconium, and 0.003% boron have been welded by gas tungsten arc (TGA) and electron beam (EB) welding techniques. The gas tungsten arc welds were made under a variety of conditions including using filler metal formed of these alloys, with or without a preheat of 400° C., under normal gas shielding conditions using argon, and in an atmosphere controlled glove box. These TGA welds have also been made with alternating current or direct current and with low and high input welding techniques. The electron beam welds were made on these alloys in a vacuum chamber without preheating. Occasionally, by employing such welding techniques, a crack-free weld was obtained but in most instances the welds were found to contain solidification or hot cracks in the weld fusion zone. Also, when attempts to duplicate a successful crack-free weld were made, hot cracking generally occurred in the weld. This lack of satisfactory weldability found in these nickel aluminide alloys represents a significant drawback to the use of these otherwise desirable alloys in many engineering applications.

SUMMARY OF THE INVENTION

Accordingly, it is a principal aim or objective of the present invention to substantially minimize or obviate the problems associated with the welding of nickel aluminide alloys including those as described in assignee's aforementioned patents by providing weldable nickel aluminide alloys in which the chemistry of the alloys is modified in such a manner so as to render these alloys highly resistant to solidification cracking or weld hot cracking without detracting from the ductility, yield strength, and other desirable properties of the nickel aluminide alloys. Generally, the weldable nickel aluminide alloys of the present invention comprise a nickel phase and, in wt. %, about 6–12% aluminum, about 6.0–12% chromium, up to about 3% molybdenum, up to about 0.5% boron, and zirconium in a concentration sufficient to provide an adequate concentration of a Ni—Zr eutectic phase in the weld region for rendering the alloy substantially resistant to weld hot cracking. In accordance with the present invention, nickel aluminide alloy compositions such as described in assignee's aforementioned U.S. patents are provided with zirconium concentrations of greater than 2.6% (1.5 at. %) in order to provide the weld region with the volume of the Ni—Zr eutectic phase necessary to render the alloys substantially resistant to weld hot cracking.

Another object of the present invention is to provide modified nickel aluminide alloys which are weldable in a reproducible manner with no, or essentially no, evidence of weld hot cracking by employing conventional gas tungsten arc and electron beam welding processes.

Another object of the present invention is to provide a weld filler metal formed from these modified nickel aluminide alloys for welding nickel aluminide alloys such as described in the aforementioned patents whereby the welds are essentially, if not entirely, free of weld hot cracking. This weld filler metal for nickel aluminide alloys comprises a nickel base and, in a wt. % about 6–12% aluminum, about 6.0–12% chromium, up to about 3.0% molybdenum, up to about 0.5% boron, and zirconium in a concentration greater than 2.6% and sufficient to provide an adequate concentration of the nickel zirconium eutectic phase in the weld region for rendering the weld substantially resistant to weld hot cracking. Inasmuch as the nickel aluminide alloys described in assignee's aforementioned patents represent nickel aluminide alloys improved by the present invention to significantly increase the weldability thereof, these patents are specifically incorporated herein by reference.

Other and further objects of the present invention will become obvious upon an understanding of the illustrative embodiments about to be described or will be indicated in the appended claims, and various advantages not referred to herein will occur to one skilled in the art upon employment of the invention in practice.

Preferred embodiments of the invention have been chosen for the purpose of illustration and description. The preferred embodiments illustrated are not intended to be exhaustive nor to limit the invention to the precise form shown. The preferred embodiments are chosen and described in order to best explain the principles of the invention and their application and practical use to thereby enable others skilled in the art to best utilize the invention in various embodiments and modifications as are best adapted to the particular use contemplated. For example, while the weld filler metal of the present invention is illustrated and described as being used for crack-free welding of the alloys in assignee's aforementioned patents and such alloys as modified in accordance with the present invention, it is to be understood that the present filler metal can be used to provide crack-free welds in other previously known nickel aluminide alloys. When modifying such other nickel aluminide alloys the zirconium concentration in the alloy or the filler metal must be sufficient to assure the presence of an adequate concentration of the Ni—Zr eutectic phase in the weld region to at least substantially prevent weld hot cracking.

The nickel aluminide alloys described in assignee's aforementioned patents and such alloys as modified by the present invention to improve the weldability of these alloys are identified herein by using the same numerical designation as in these patents but with the alloys of the present invention distinguished therefrom by employing the letter designation "W" following the numerical designation of the alloy.

DETAILED DESCRIPTION OF THE INVENTION

As generally described above, the present invention is directed to the modification of previously known nickel aluminide alloys, particularly the IC221 and the IC396 alloys described in assignee's aforementioned patents, to render such alloys highly resistant to weld hot cracking and thereby providing nickel aluminide alloys with weldability characteristics heretofore essentially unachievable, especially in a reproducible manner.

Figure 1:
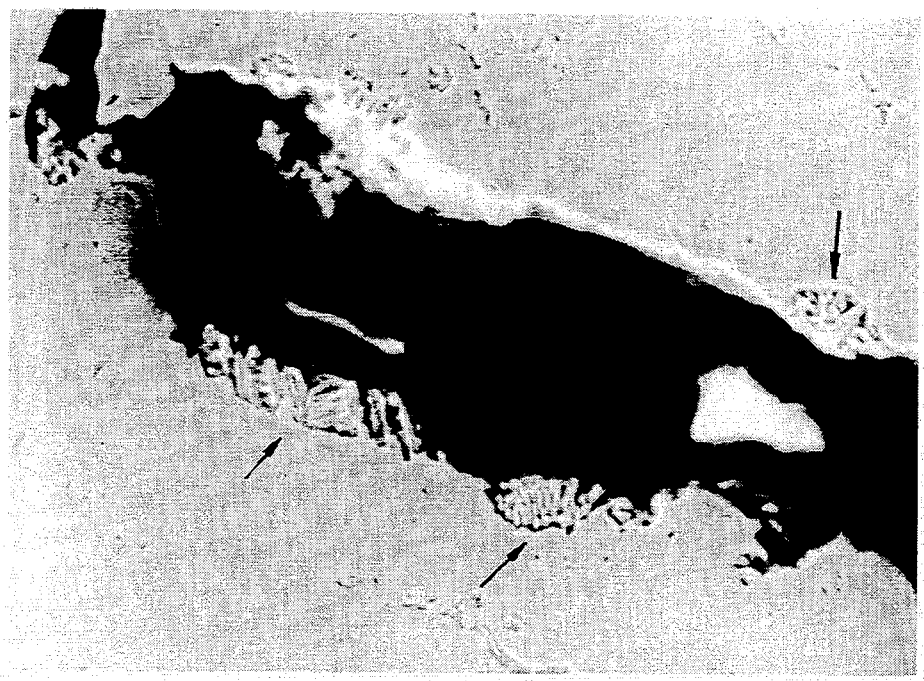
FIG. 1 is a photomicrograph taken with a scanning electron microscope showing a hot crack in a weld made in a casting of the above described IC396 alloy and the presence of a Ni—Zr eutectic phase in the weld area.
Figure 2:
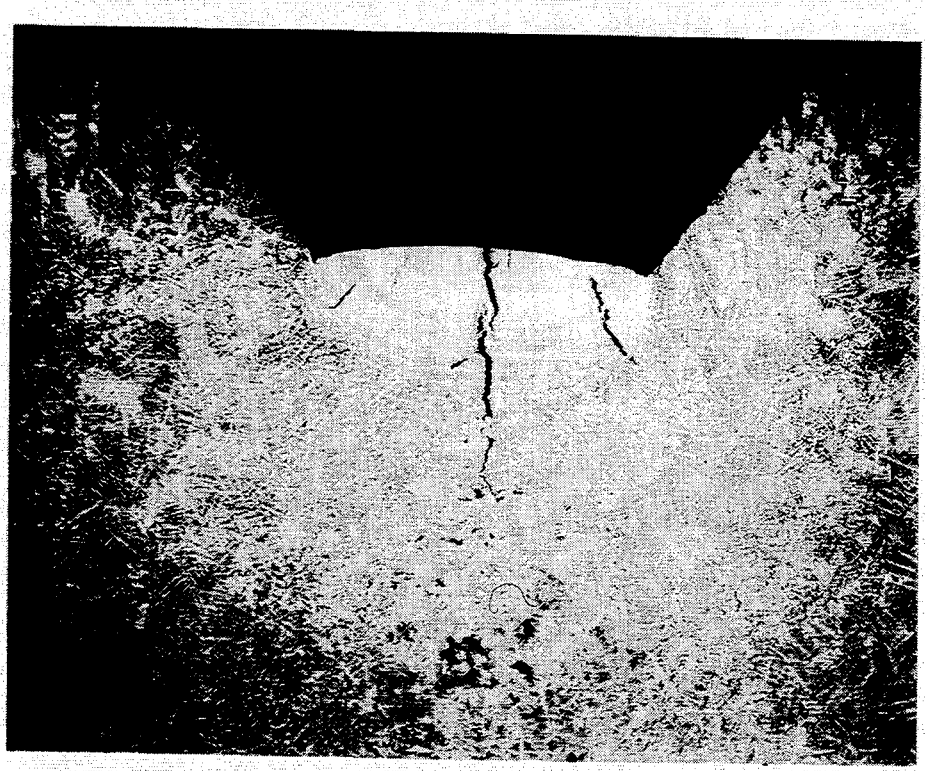
FIG. 2 is another photomicrograph showing extensive hot cracking in a single pass weld made in a casting of the IC396 alloy by manual gas tungsten arc welding employing a filler metal formed of the IC396 alloy.
Figure 3:
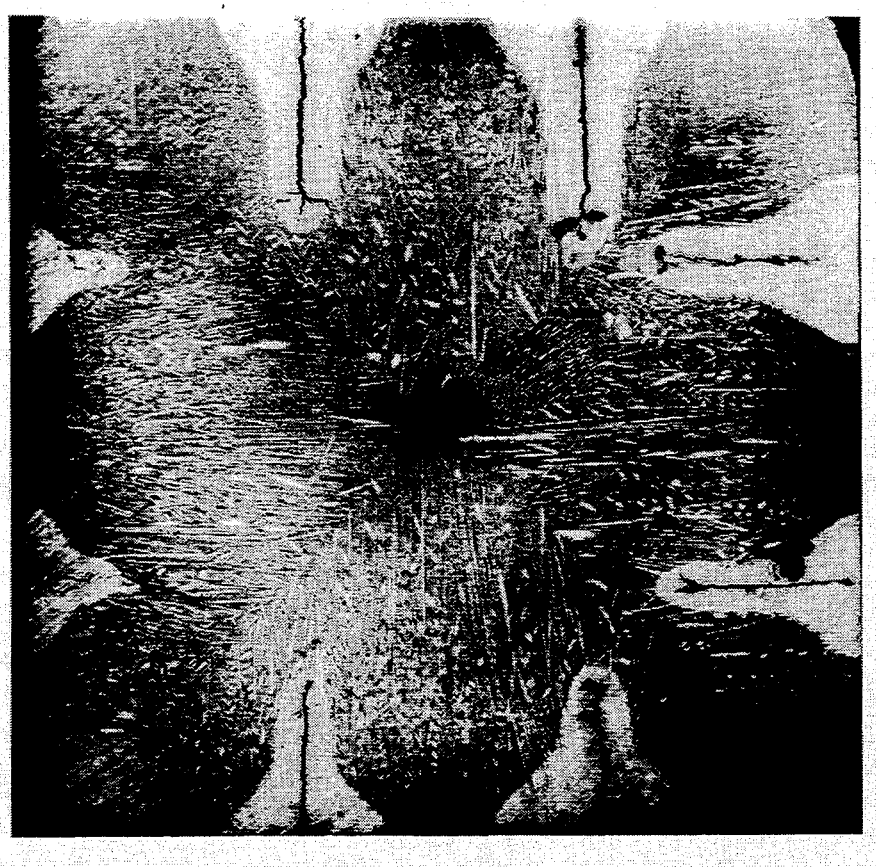
FIG. 3 is a photomicrograph illustrating hot cracks in welds on a casting of the IC396 alloy as provided by electron beam welding.

In order to overcome the weldability problems associated with the previously known nickel aluminide alloys, welds were made on the IC221 and IC396 alloys and detailed metallographic studies made of the microstructural features associated with the weld hot cracking. For example, FIGS. 1-3 show welds made on the IC396 alloy by using various conventional welding techniques including autogenous electron beam and gas tungsten arc welding, manual gas tungsten arc welding with a filler metal formed of the IC396 alloy in an argon atmosphere without preheat as in FIG. 2. FIG. 3 shows autogenous welds made by electron beam welding in vacuum using eight different conventional welding parameters. The welds in each of these alloy castings exhibit extensive hot cracking. The metallographic studies of the hot cracks in the welds in the IC396 alloy as well as the IC221 alloy show that a Ni—Zr eutectic phase of $Ni_5$—Zr and a solid solution of nickel was usually present along the cracks in the weld. For example, as illustrated in FIG. 1 an autogenous weld in a IC396 casting exhibits the Ni—Zr eutectic phase as indicated by the arrows at several spaced apart locations along the hot crack.

In accordance with the present invention, it was discovered by increasing the concentrations of the zirconium, preferably as a nickel replacement, in the compositions of the IC396 and the IC221 alloys as described in assignee's aforementioned patents to greater than 2.6 wt. % (1.5 at. %) i.e., at least 2.61 wt. %, that the resistance of these alloys to weld hot cracking was significantly improved to a point where weld hot cracking was essentially, if not entirely, absent from the welds provided by conventional gas tungsten arc and electron beam techniques. The compositions of these IC396W and the IC221W alloys except for the increased concentration of zirconium and a corresponding reduction in nickel are the same as those of the IC396 and the IC221 alloys described in assignee's aforementioned patents.

Figure 4:
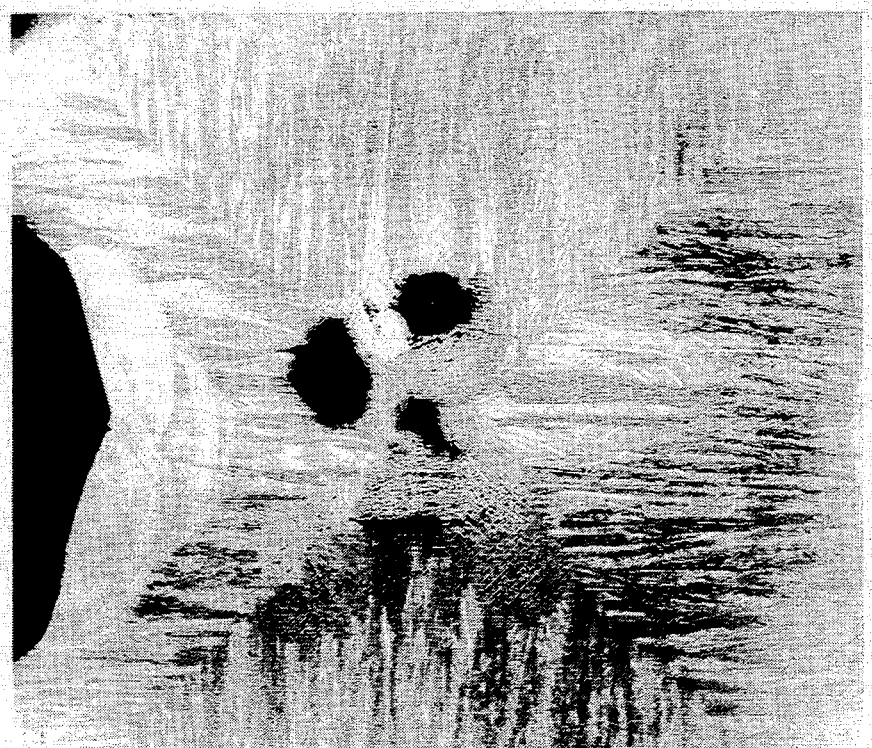
FIG. 4 is a photomicrograph showing crack-free gas tungsten arc and electron beam welds made in a casting of the IC396 alloy as modified in accordance with the present invention.
Figure 5:
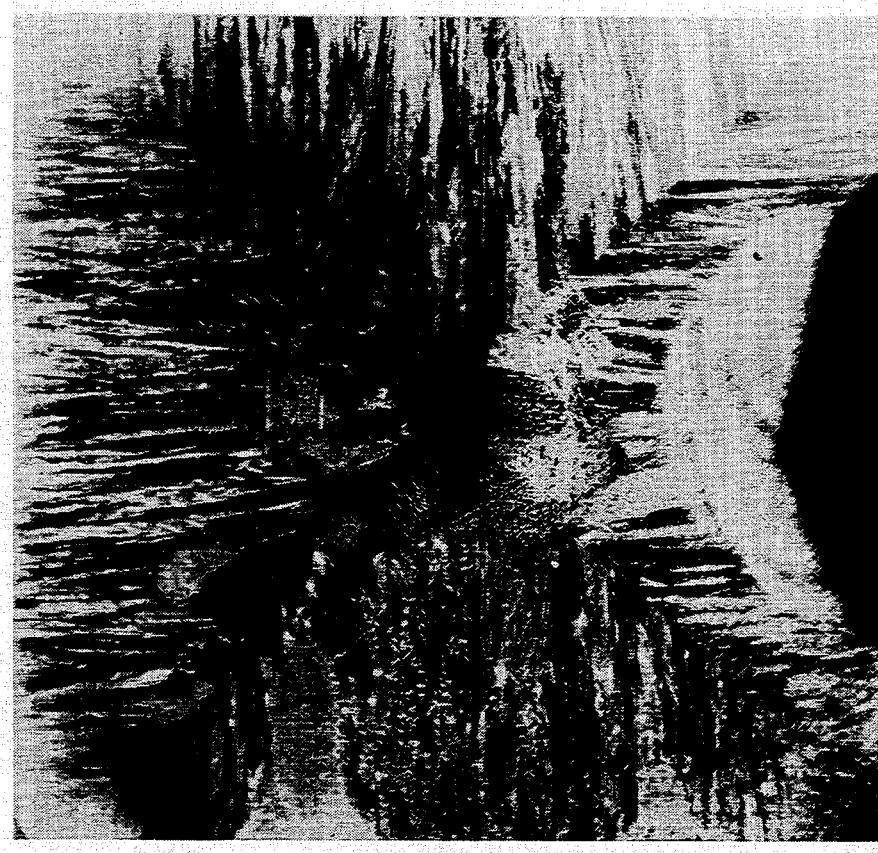
FIG. 5 is a photomicrograph showing crack-free gas tungsten arc and electron beam welds made in a casting of the IC221 alloy as modified in accordance with the present invention.

This increase in weldability provided in the IC396W and the IC221W alloys is illustrated in the photomicrographs of FIGS. 4 and 5 which are cross-sectional views of gas tungsten arc and electron beam welds, respectively, and which indicate that no hot weld cracks were present even when weld beads (three weld beads in FIG. 5) were deposited in grooves in castings of these alloys using a manual gas tungsten arc technique employing weld filler metal prepared from the improved alloys of the present invention. Metallographic analyses of the welds in the IC396W and the IC221W alloys indicated that the higher zirconium concentrations resulted in an increased amount of the Ni—Zr eutectic phase in the weld area. Thus, it is expected that this higher concentration of the Ni—Zr eutectic phase in the weld area is the mechanism responsible for the improved resistance of these alloys to weld hot cracking. It was also found during tests of the physical properties in these alloys that the higher zirconium levels in the alloys did not detract from the ductility and the high temperature strength of the alloys.

To further substantiate the weldability of the IC396W and the IC221W alloys as compared to the IC396 and the IC221 alloys described in assignee's aforementioned patents, a variety of welds were made on castings (25×25×75-mm) of these four alloys as shown in the Table below. In this demonstration gas tungsten arc welds made on these alloys were represented by autogenous bead-on-plate welds (BOP), autogenous groove welds (AG), and groove welds using a filler metal of the same composition as that of the particular alloy being welded. The groove welds consist of a single-bead weld (FM1) in a 6-mm-deep groove using argon shielding gas with no preheat and a three-bead weld (FM3) made under similar welding conditions as the FM1 welds. Filler metals for the manual gas tungsten arc welds in the grooves in the IC396W and the alloys were formed by first cutting a 25×25×6-mm slice from each alloy casting. These pieces of the alloys were then cold-rolled into 1-mm-thick sheets using successive 10% reductions followed by annealing at 1100° C. for 1 hour in vacuum. The sheets were then sheared into 1-2 mm wide strips which were used as the weld filler metals. The welds made with these filler metals were crack free and thus provided a significant improvement over similar type welds produced in the IC396 and the IC221 alloys which typically contained numerous and relatively large hot cracks. Deep penetration electron beam welds on these alloys were also compared as shown in the Table below. In this Table the weldability of the alloys is denoted by the term "yes" and is indicative of the fact that hot cracking was not observed in the welds, whereas the term "no" is indicative of the lack of weldability due to the presence of weld hot cracking. This Table shows that the IC396W and the IC221W alloys are weldable by all of the aforementioned weld techniques. On the other hand, the Table also shows that the previously known IC221 alloy is weldable only when using an autogenous bead on a plate-type weld. This Table further shows that the alloys of the present invention possess a Rockwell hardness (Re) greater than that of the IC396 and IC221 alloys described in assignee's aforementioned patents while maintaining an acceptable level of fabricability as evidenced by the castings being capable of sustaining a cold rolling reduction of 10% without cracking.

TABLE

| Alloy | Weldability | | | | | Hardness, $R_c$ | | Fabricate |
|---|---|---|---|---|---|---|---|---|
| | BOP | AG | FM1 | FM3 | EB | BM | WM | |
| IC396 | no | no | no | no | no | 33 | 18 | yes |
| IC396W | yes | yes | yes | yes | yes | 39 | 30 | yes |
| IC221 | yes | no | no | no | no | 34 | 26 | yes |
| IC221W | yes | yes | yes | yes | yes | 38 | 27 | yes |

The concentration of zirconium usable in the alloys of the present invention for providing the improved weldability of these weldable nickel aluminide alloys is in the range of 2.61 to about 13 wt. %, preferably 2.61 to about 6 wt. % or 1.51 to about 3.5 at. %.

The nickel aluminide alloys which can be provided with improved weldability by using such increases in the zirconium concentration include and are preferably those described in assignee's aforementioned patents, particularly the IC396 and the IC221 alloys. In accordance with the present invention, the composition of the weldable nickel aluminide alloys consists essentially of, in wt. %, 5.9-12.1% aluminum (12.0-23.3 at %), 5.9-12.1% chromium (6.2-12.1 at %), 2.61-13.0% zirconium, 0.0-3.0% molybdenum (0.0-1.7 at %), 0.0-0.5% boron (0.0-0.2 at %), and the balance nickel.

It was also discovered that weld filler metal prepared from the weldable alloys of the present invention provided crack-free gas tungsten arc groove welds in the previously known IC396 and the IC221 alloys. It is expected that these crack-free welds were formed in these alloys due to the presence of sufficient concentrations of the Ni—Zr eutectic phase in the weld area as provided by the increased zirconium concentrations in the weld filler metal. It is further expected that filler metals formed of the weldable nickel aluminide alloys of the present invention can be used for surfacing metals such as stainless steel and the like for improving the wear properties and increasing the resistance of these alloys to erosion and corrosion.

It will be seen that the present invention provides for a significant improvement in nickel aluminide alloys by providing them with weldability properties not previously available with such alloys. Further, these improved nickel aluminide alloys are readily weldable by employing conventional gas tungsten arc and electron beam welding techniques.

What is claimed is:

1. A weldable nickel aluminide alloy characterized by being substantially resistant to weld hot cracking, comprising a nickel base and, in wt. %, about 6-12% aluminum, about 6.0-12% chromium, up to about 3% molybdenum, up to about 0.5% boron, and zirconium in a concentration of at least 3.17% and sufficient to provide an adequate concentration of Ni—Zr eutectic phase in the alloy for rendering the weld region of the alloy substantially resistant to weld hot cracking.

2. A weldable nickel aluminide alloy as claimed in claim 1, wherein the zirconium concentration of at least 3.17% is a zirconium concentration in the range of 3.17% to about 6.0%.

3. A weldable nickel aluminide alloy as claimed in claim 1, wherein the concentration of aluminum is 8%, the concentration of chromium is 7.7%, the concentration of molybdenum is 3.0%, the concentration of boron is 0.003%, and the concentration of zirconium of at least 3.17% is a zirconium concentration in the range of 3.17% to about 6.0%.

4. A weldable nickel aluminide alloy as claimed in claim 1, wherein the concentration of aluminum is 8%, the concentration of chromium is 7.7%, the concentration of molybdenum is 1.5%, the concentration of boron is 0.003%, and the concentration of zirconium is in the range of 3.17% to about 6.0%.

5. A weld filler metal for welding nickel aluminide alloys comprising a nickel base and, in wt. %, of about 6-12% aluminum, about 6.0-12% chromium, up to about 3.0% molybdenum, up to about 0.5% boron, and zirconium in a concentration of at least 3.17% and sufficient to provide an adequate concentration of an Ni—Zr eutectic phase in a weld region of nickel aluminide alloys welded thereby for rendering the weld substantially resistant to weld hot cracking.

6. The weld filler metal as claimed in claim 5, wherein the zirconium concentration of at least 3.17% is a zirconium concentration in the range of 3.17% to about 6%.

7. A composite structure comprising at least two nickel aluminide articles welded together with the weld exhibiting essentially no cracks due to weld hot cracking and with the weld comprising a nickel base and, in wt. %, about 6-12% aluminum, about 6.0-12% chromium, up to about 3.0% molybdenum, up to about 0.5% boron, and zirconium in a concentration greater than 2.6%, said weld comprising substantial concentrations of an Ni—Zr eutectic phase.

8. A composite structure as claimed in claim 7, wherein at least one of said at least two nickel aluminide articles comprises a nickel base, and in wt. %, about 6-12% aluminum, about 6.0-12% chromium, up to about 3.0% molybdenum, up to about 0.5% boron, and zirconium in a concentration greater than 2.6%.

9. A composite structure as claimed in claim 7, wherein at least one of said, at least two nickel aluminide articles comprises a nickel base, and in wt. %, about 6-12% aluminum, about 6.0-12% chromium, up to about 3.0% molybdenum, up to about 0.5% boron, and zirconium in a concentration up to 2.6%.

10. A composite structure as claimed in claim 7, wherein said weld is provided by weld filler metal comprising a nickel base and, in wt. %, about 6-12% aluminum, about 6.0-12% chromium, up to about 3.0% molybdenum, up to about 0.5% boron, and zirconium in a concentration greater than 2.6%.

* * * * *